United States Patent
Wang (10) Patent No.: US 10,547,720 B2
(45) Date of Patent: Jan. 28, 2020

(54) METHOD AND SYSTEM FOR AUTOMATICALLY SAVING UNKNOWN NUMBER IN MOBILE PHONE

(71) Applicant: JRD Communication Inc., Shenzhen (CN)

(72) Inventor: Song Wang, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 0 days.

(21) Appl. No.: 16/328,733

(22) PCT Filed: Aug. 1, 2017

(86) PCT No.: PCT/CN2017/095531
§ 371 (c)(1),
(2) Date: Feb. 27, 2019

(87) PCT Pub. No.: WO2018/040830
PCT Pub. Date: Mar. 8, 2018

(65) Prior Publication Data
US 2019/0199842 A1    Jun. 27, 2019

(30) Foreign Application Priority Data
Aug. 30, 2016  (CN) .......................... 2016 1 0762588

(51) Int. Cl.
*H04W 4/00* (2018.01)
*H04M 1/2745* (2006.01)
(Continued)

(52) U.S. Cl.
CPC ...... *H04M 1/274533* (2013.01); *G06F 9/542* (2013.01); *G06F 17/277* (2013.01);
(Continued)

(58) Field of Classification Search
CPC .......... H04M 3/42059; H04M 3/4931; H04M 3/42042; H04M 3/436; H04W 4/16;
(Continued)

(56) References Cited

U.S. PATENT DOCUMENTS

2012/0237006 A1* 9/2012 Kim ................ H04M 1/274516
379/88.01
2013/0143521 A1* 6/2013 Hernandez .............. H04L 67/22
455/405

(Continued)

FOREIGN PATENT DOCUMENTS

CN        101951432        1/2011
CN        102694896        9/2012
(Continued)

OTHER PUBLICATIONS

International Search Report dated Sep. 28, 2017 From the International Searching Authority Re. Application No. PCT/CN2017/095531. (6 Pages).

*Primary Examiner* — Khalid W Shaheed (57) ABSTRACT

A method for automatically saving an unknown number in a mobile phone includes comparing a telephone number being answered or dialed with numbers in an address book, and determines whether the telephone number is an unknown number. If yes, conversation content is monitored, and keywords of the conversation content are extracted after the call is successfully connected. After the call ends, a user is prompted whether to save, if yes, the keywords are arranged in order for the user to select.

15 Claims, 3 Drawing Sheets

(51) Int. Cl.
*G06F 9/54* (2006.01)
*G06F 17/27* (2006.01)
*H04M 1/275* (2006.01)

(52) U.S. Cl.
CPC ........ *G06F 17/2785* (2013.01); *H04M 1/275* (2013.01); *H04M 1/2745* (2013.01); *H04M 1/274508* (2013.01)

(58) Field of Classification Search
CPC ... H04W 8/26; H04W 36/0022; H04W 68/00; H04W 68/005; H04W 12/00514; H04L 61/1594; H04L 63/126
See application file for complete search history.

(56) References Cited

U.S. PATENT DOCUMENTS

| | | |
|---|---|---|
| 2015/0098556 A1 | 4/2015 | Mathur et al. |
| 2016/0182716 A1* | 6/2016 | Tatourian .............. H04M 3/436 455/413 |
| 2016/0360036 A1* | 12/2016 | Ansari .................. H04M 3/436 |

FOREIGN PATENT DOCUMENTS

| | | |
|---|---|---|
| CN | 103167121 | 6/2013 |
| CN | 103354575 A * | 10/2013 |
| CN | 105049579 | 11/2015 |
| CN | 105681566 | 6/2016 |
| CN | 106161713 | 11/2016 |
| WO | WO 2018/040830 | 3/2018 |

* cited by examiner

METHOD AND SYSTEM FOR AUTOMATICALLY SAVING UNKNOWN NUMBER IN MOBILE PHONE

RELATED APPLICATIONS

This application is a National Phase of PCT Patent Application No. PCT/CN2017/095531 having International filing date of Aug. 1, 2017, which claims the benefit of priority of Chinese Patent Application No. 201610762588.3 filed on Aug. 30, 2016. The contents of the above applications are all incorporated by reference as if fully set forth herein in their entirety.

FIELD AND BACKGROUND OF THE INVENTION

The present disclosure relates to the field of mobile terminal technologies, and more particularly to a method and a system for automatically saving an unknown number in a mobile phone.

As the most commonly used communication tool, mobile phones can greatly facilitate users to get in touch with others and establish a call. Cellphone communication generally has a display screen and has a Caller ID Display functionality when there is an incoming call. The so-called Caller ID Display functionality means that when user A calls user B, user B can receive a telephone number and other information of the caller, user A, sent by a switch, and the telephone number of user A will be shown on the display screen. If the telephone number is saved in an address book of user B, the information, such as the name of the user, A can also be displayed on the display screen. In this way, user B can know who is calling before answering the call. If the telephone number does not exist in the address book of user B, that is, the telephone number is an unknown number to the user B, the mobile terminal of user B will prompt the user to mark the number, and to select whether to save or not. Moreover, the user may not be able to save in time, which is highly dependent on the user, thereby bringing a large amount of work to the user. It is not very convenient to operate, and does not achieve humanization and intelligence.

At present, most mobile phones on market have a function of extracting the unknown number in a call record and saving it to the address book. However, this function requires the user to initiate the process. The entire process of saving the unknown number requires the user to perform manual operations. The whole process is cumbersome, and for people who have a lot of calls, the unknown number in a call list of the mobile phone may be more. If the user does not have time to save, and wants to save it later, it may not be able to save it because the user can't remember which number corresponds to which person. That is, it may be confused because there are multiple number records, so it cannot be saved correctly. Moreover, some important contact information may be deleted before it is saved, which brings great inconvenience to the user.

SUMMARY OF THE INVENTION

The embodiments of the present disclosure provides a method and a system for automatically saving an unknown number in a mobile phone, which can avoid confusion caused by excessive unknown number in the mobile phone of user, and facilitates the user to manage and save the unknown number.

An embodiment of the present disclosure provides a method for automatically saving an unknown number in a mobile phone, including:

step A, comparing, by a system of the mobile phone, a telephone number being answered or dialed with numbers in an address book when the mobile phone is answering or dialing a call, and determining whether the telephone number is an unknown number;

step B, if the telephone number is an unknown number, monitoring a conversation content after the call is successfully connected, and semantically analyzing the conversation content during the monitoring, and extracting keywords from the conversation content;

step C, automatically popping up a prompt box on a screen of the mobile phone after the call ends, which prompts a user whether it is necessary to save the unknown number, where if the answer is necessary, the keywords are arranged in order for the user to select.

In the method for automatically saving the unknown number in the mobile phone, before the step A, the method further includes:

step S, enabling a function of automatically saving the unknown number in a setting of the mobile phone in advance, where when the function is enabled, the system simultaneously turns on a permission function in a processor to semantically analyze the conversation content, and a duration of the semantic analysis is two minutes after the call is successfully connected.

In the method for automatically saving the unknown number in the mobile phone, the keywords include a title and a name.

In the method for automatically saving the unknown number in the mobile phone, the step A further includes:

A1, when the mobile phone is answering or dialing the call and the screen also displays the phone number with a name or a title, indicating that the telephone number is in the address book, where the system does not compare the telephone number being answered or dialed with the numbers in the address book.

In the method for automatically saving the unknown number in the mobile phone, the step B further includes:

B1, operating the system not to process a telephone number and carrying on a normal conversation when it is determined that the telephone number being answered or dialed is not an unknown number;

B2, monitoring the conversation content for two minutes when it is determined that the call being answered or dialed is an unknown number, after the call is successfully connected, where the conversation content is semantically analyzed during the monitoring, and a period of the monitoring and a period of the semantic analysis are the same;

B3, extracting the keywords from the conversation content as alternative options for a saved name of the unknown number.

In the method for automatically saving the unknown number in the mobile phone, the step C further includes:

C1, after the call ends, arranging in order of the semantic analysis, by the system, the keywords obtained from the semantic analysis of the conversation content for a period of two minutes;

C2, automatically popping up the prompt box on the screen of the mobile phone after the call ends, where when the unknown number is selected to be saved, the keywords are presented in a list for the user to select, and if the user chooses not to save, the monitored conversation is deleted;

C3, manually modifying the keyword in the list and entering a correct name relative to the unknown number to be saved when there is an error in the keyword in the list, that is, the keyword obtained from the semantically analysis are not totally semantically correct.

An embodiment of the present disclosure provides a system for automatically saving an unknown number in a mobile phone, including:

one or more processors;

a storage; and one or more application programs, where the one or more application programs are saved in the storage and configured to be executed by the processor;

a pre-enablement module for enabling a function of automatically saving an unknown number in a setting of the mobile phone in advance, where when the function is enabled, the system simultaneously turns on a permission function in the processor to semantically analyze the conversation content, and a duration of the semantic analysis is two minutes after a call is successfully connected;

a number comparison module for comparing, by the system of the mobile phone, a telephone number being answered or dialed with numbers in an address book when the mobile phone is answering or dialing the call, and determining whether the telephone number is an unknown number;

a monitor analysis module for monitoring a conversation content after the call is successfully connected if the telephone number is an unknown number, and semantically analyzing the conversation content during the monitoring, and extracting keywords from the conversation content;

a prompt storage module for automatically popping up a prompt box on a screen of the mobile phone after the call ends, which prompts a user whether it is necessary to save the unknown number, where if an answer is necessary, the keywords are arranged in order for the user to select.

In the system for automatically saving the unknown number in the mobile phone, the keywords include a title and a name.

In the system for automatically saving the unknown number in the mobile phone, the number comparison module further includes:

a number judgment unit for determining that the telephone number is in the address book, when the mobile phone is answering or dialing the call and the screen also displays the phone number with a name or a title, where the system does not compare the telephone number being answered or dialed with the numbers in the address book.

In the system for automatically saving the unknown number in the mobile phone, the monitor analysis module further includes:

a normal conversation unit for operating the system not to process a telephone number and carrying on a normal conversation when it is determined that the telephone number being answered or dialed is not an unknown number;

a semantic analysis unit for monitoring the conversation content for two minutes when it is determined that the call being answered or dialed is an unknown number, after the call is successfully connected, where the conversation content is semantically analyzed during the monitoring, and a period of the monitoring and a period of the semantic analysis are the same;

a keyword extraction unit for extracting the keywords from the conversation content as alternative options for a saved name of the unknown number.

In the system for automatically saving the unknown number in the mobile phone, the prompt storage module further includes:

a keyword arrangement unit, after the call ends, for arranging in order of the semantic analysis, by the system, the keywords obtained from the semantic analysis of the conversation content for a period of two minutes;

a storage selection unit for automatically popping up the prompt box on the screen of the mobile phone after the call ends, where when the unknown number is selected to be saved, the keywords are presented in a list for the user to select, and if the user chooses not to save, the monitored conversation is deleted;

a storage modification unit for manually modifying the keyword in the list and entering a correct name relative to the unknown number to be saved when there is an error in the keyword in the list, that is, the keyword obtained from the semantically analysis are not totally semantically correct.

A system for automatically saving an unknown number in a mobile phone includes:

one or more processors;

a storage; and one or more application programs, where the one or more application programs are saved in the storage and configured to be executed by the processor to perform following steps:

step A, comparing, by the system of the mobile phone, a telephone number being answered or dialed with numbers in an address book when the mobile phone is answering or dialing a call, and determining whether the telephone number is an unknown number;

step B, if the telephone number is an unknown number, monitoring a conversation content after the call is successfully connected, and semantically analyzing the conversation content during the monitoring, and extracting keywords from the conversation content;

step C, automatically popping up a prompt box on a screen of the mobile phone after the call ends, which prompts a user whether it is necessary to save the unknown number, where if an answer is necessary, the keywords are arranged in order for the user to select.

In the system for automatically saving the unknown number in the mobile phone, before the step A, the processor is configured to execute:

step S, enabling a function of automatically saving the unknown number in a setting of the mobile phone in advance, where when the function is enabled, the system simultaneously turns on a permission function in a processor to semantically analyze the conversation content, and a duration of the semantic analysis is two minutes after the call is successfully connected.

In the system for automatically saving the unknown number in the mobile phone, the keywords include a title and a name.

In the system for automatically saving the unknown number in the mobile phone, in the step A, the processor is further configured to execute:

A1, when the mobile phone is answering or dialing the call and the screen also displays the phone number with a name or a title, indicating that the telephone number is in the address book, where the system does not compare the telephone number being answered or dialed with the numbers in the address book.

In the system for automatically saving the unknown number in the mobile phone, in the step B, the processor is configured to execute:

B1, operating the system not to process a telephone number and carrying on a normal conversation when it is determined that the telephone number being answered or dialed is not an unknown number;

B2, monitoring the conversation content for two minutes when it is determined that the call being answered or dialed is an unknown number, after the call is successfully connected, where the conversation content is semantically analyzed during the monitoring, and a period of the monitoring and a period of the semantic analysis are the same;

B3, extracting the keywords from the conversation content as alternative options for a saved name of the unknown number.

In the system for automatically saving the unknown number in the mobile phone, in the step C, the processor is configured to execute:

C1, after the call ends, arranging in order of the semantic analysis, by the system, the keywords obtained from the semantic analysis of the conversation content for a period of two minutes;

C2, automatically popping up the prompt box on the screen of the mobile phone after the call ends, where when the unknown number is selected to be saved, the keywords are presented in a list for the user to select, and if the user chooses not to save, the monitored conversation is deleted;

C3, manually modifying the keyword in the list and entering a correct name relative to the unknown number to be saved when there is an error in the keyword in the list, that is, the keyword obtained from the semantically analysis are not totally semantically correct.

The embodiments of the present disclosure provide a method and a system for automatically saving an unknown number in a mobile phone. The method includes: comparing, by a system of the mobile phone, a telephone number being answered or dialed with numbers in an address book when the mobile phone is answering or dialing a call, and determining whether the telephone number is an unknown number; if the telephone number is an unknown number, monitoring a conversation content after the call is successfully connected, and semantically analyzing the conversation content during the monitoring, and extracting keywords from the conversation content; and automatically popping up a prompt box on a screen of the mobile phone after the call ends, which prompts a user whether it is necessary to save the unknown number, where if an answer is necessary, the keywords are arranged in order for the user to select. The present disclosure analyzes a name of the unknown number in the mobile phone, extracts the corresponding information, and prompts the user whether to save, which can avoid confusion caused by excessive unknown number in the mobile phone of the user, and facilitates the user to manage and save the unknown number.

DESCRIPTION OF SPECIFIC EMBODIMENTS OF THE INVENTION

In order to make the objects, technical solutions, and advantages of the present disclosure to be clearer, the present disclosure will be further described in detail below with reference to the accompanying drawings and embodiments. It is understood that the specific embodiments described herein are merely illustrative of the present disclosure and are not intended to limit the present disclosure.

Figure 1:
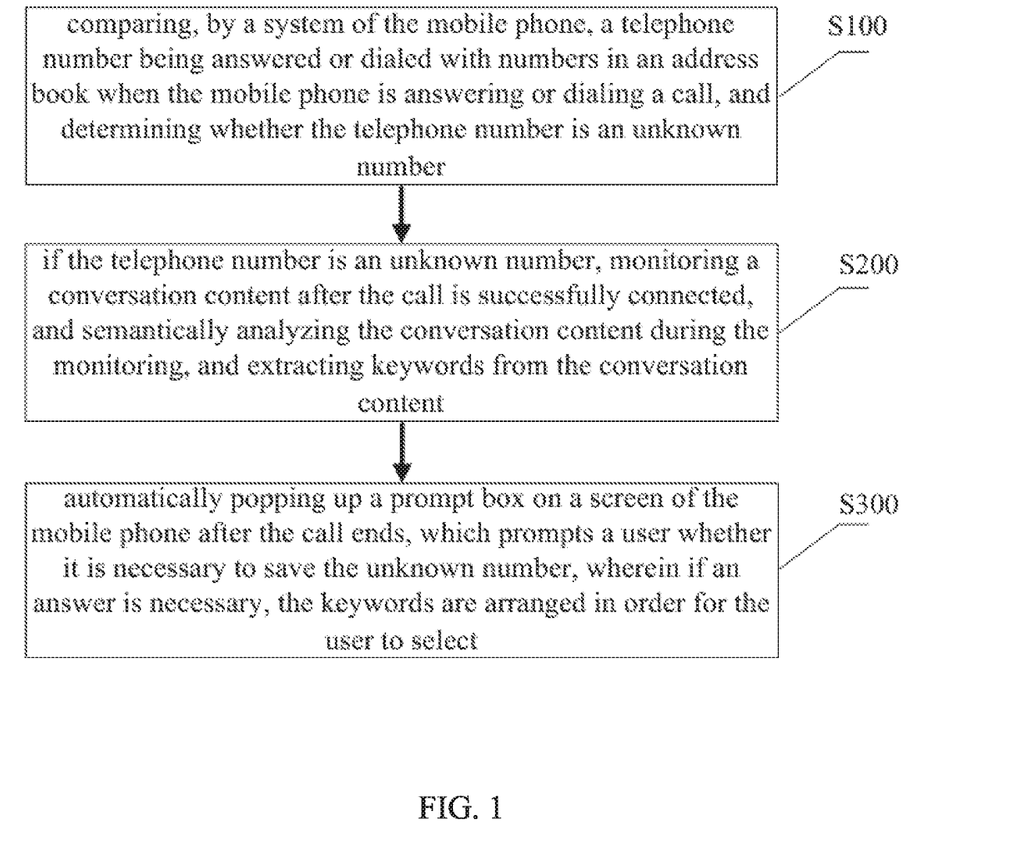
FIG. 1 is a flowchart of a preferred embodiment of a method for automatically saving an unknown number in a mobile phone of the present disclosure.

Referring to FIG. 1, which is a flowchart of a preferred embodiment of a method for automatically saving an unknown number in a mobile phone of the present disclosure.

As shown in FIG. 1, the present disclosure provides a method for automatically saving an unknown number in a mobile phone, including the following steps.

In step S100, when the mobile phone is answering or dialing a call, a system of the mobile phone compares a telephone number that is being answered or dialed with numbers in an address book, and determines whether the telephone number is an unknown number.

In the embodiment of the present disclosure, before the step S100, the method further includes that a function of automatically saving the unknown number in a setting of the mobile phone is enabled in advance. When the function is enabled, the system simultaneously turns on a permission function in a processor to semantically analyze the conversation content, and a duration of the semantic analysis is two minutes after the call is successfully connected.

Users can enable or disable the function of automatically saving the unknown number through a background setting of the mobile phone. When this function is enabled, it means that the function for automatically saving the unknown telephone number is enabled. At the same time, the permission in the processor to semantically analyze the conversation is enabled for two minutes. Because when the user is talking to someone with the unknown number, titles of the two parties are generally appeared at the beginning, so this period does not need to be too long. Moreover, this period can be adjusted according to the user's habits, for example, set to 1 minute, and the present disclosure is preferably two minutes. In addition, if the user does not need to save the unknown number, the user can turn off this function. When the user chooses to turn off this function, it means that the function for automatically saving the unknown telephone number is turned off, and the permission to semantically analyze the conversation will not be turned on.

The step S100 further includes that when the mobile phone is answering or dialing the call and the screen also displays the phone number with a name or a title, it indicates that the telephone number is in the address book, where the system does not compare the telephone number being answered or dialed with the numbers in the address book.

When the mobile phone is answering or dialing the call, if the screen displaying the telephone number does not display a name or a title, then it can be determined as unknown number, or can be determined that the system of the mobile phone is comparing the telephone number being answered or dialed with the numbers in the address book. If it is found that the number is not in the address book, the number can be determined to be unknown number.

In step S200, if the telephone number is the unknown number, a conversation content is monitored after the call is successfully connected, and the conversation content is semantically analyzed during the monitoring, and keywords from the conversation content are extracted.

In the embodiment of the present disclosure, the conversation content is monitored for two minutes when it is determined that the call being answered or dialed is an unknown number, after the call is successfully connected. The conversation content is semantically analyzed during the 2-minute monitoring, and the keywords from the conversation content are extracted. The keywords include titles and names, such as S.F. Express courier, Vanke Real Estate, delivery man, Zhang San, Li Si, etc. The reason why these titles or names are recorded as keywords is to provide a basis for saving the unknown number later.

The step S200 specifically includes that the system is operated not to process a telephone number and a normal conversation is carried on when it is determined that the telephone number being answered or dialed is not an unknown number. The conversation content for two minutes is monitored when it is determined that the call being answered or dialed is an unknown number, after the call is successfully connected, where the conversation content is semantically analyzed during the monitoring. A period of the monitoring and a period of the semantic analysis are the same. The keywords from the conversation content are extracted as alternative options for a saved name of the unknown number.

In step S300, a prompt box automatically pops up on a screen of the mobile phone after the call ends, which prompts a user whether it is necessary to save the unknown number, where if an answer is necessary, the keywords are arranged in order for the user to select.

In the embodiment of the present disclosure, after the conversation with the unknown telephone number ends, the prompt box automatically pops up on the screen of the mobile phone, asking if the user needs to save the unknown number. If the user selects "need to save", the extracted keyword information is listed in the form of a list for the user to select. The user can also choose to "reject save." Additionally, if there is any error in the title or name of the keyword in the list, or the wrong one, the user can choose to select a one of keywords and then manually modify the keyword and entering the correct name.

The step S300 specifically includes that after the call ends, the system arranges, in order of the semantic analysis, the keywords obtained from the semantic analysis of the conversation content for a period of two minutes in order of analysis after the call ends. The prompt box automatically pops up on the screen of the mobile phone after the call ends. When the unknown number is selected to be saved, the keywords are presented in a list for the user to select, and if the user chooses not to save, the monitored conversation is deleted. The keyword in the list is manually modified and a correct name relative to the unknown number is entered to be saved when there is an error in the keyword in the list, that is, the keyword obtained from the semantically analysis are not totally semantically correct.

Figure 2:
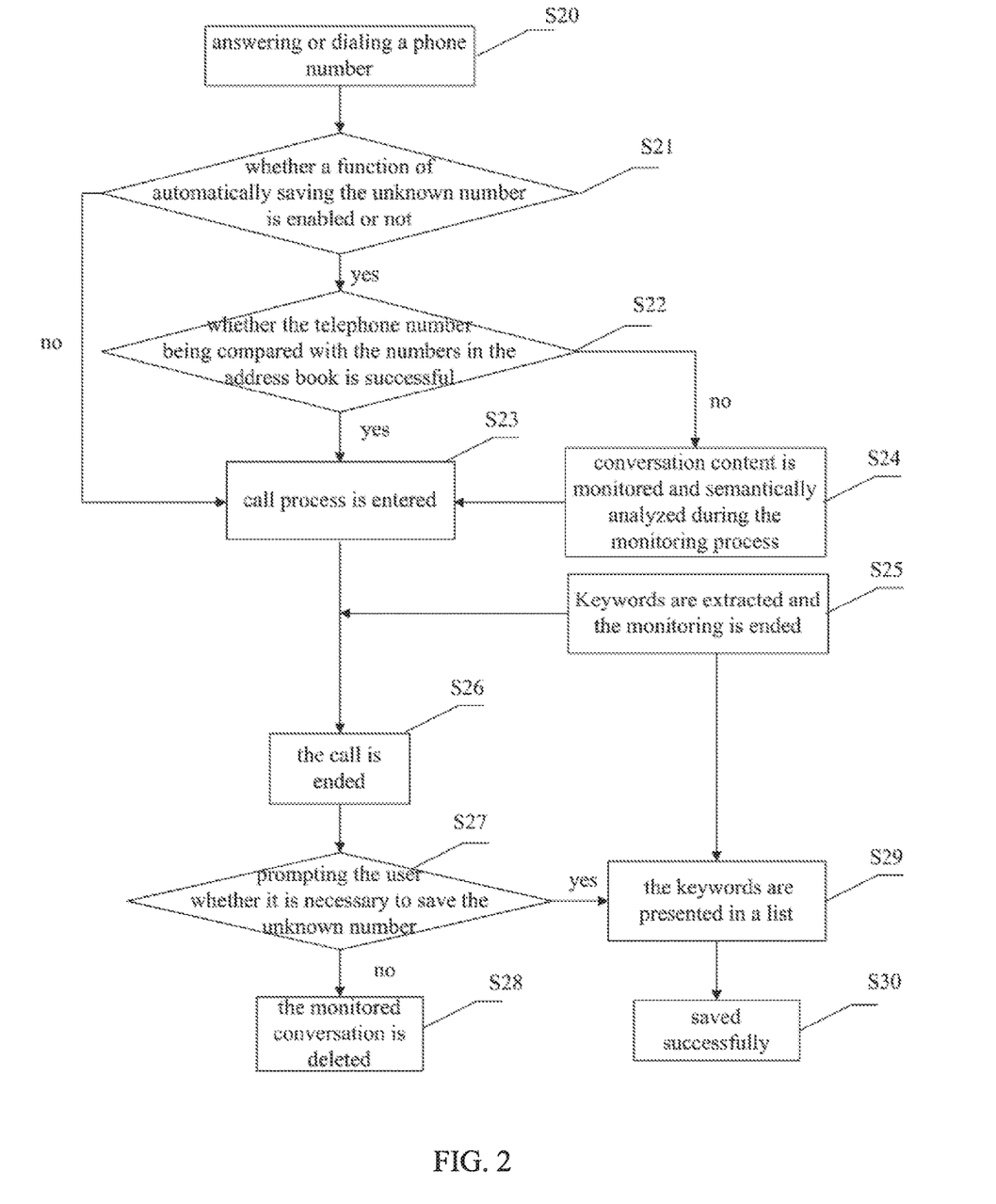
FIG. 2 is a flowchart of a specific embodiment of the method for automatically storage the unknown number in the mobile phone of the present disclosure.

In order to make the method for automatically saving the unknown number in the mobile phone clearer, the flow of a specific embodiment is given below. Referring to FIG. 2, which is a flowchart of a specific embodiment of the method for automatically storage the unknown number in the mobile phone of the present disclosure.

As shown in FIG. 2, the process of the specific embodiment includes:

S20, firstly, it is in a state either the mobile phone is answering or dialing a call.

S21, the function of automatically saving the unknown number is determined whether to be enabled or not. If it is determined that the function is not enabled, S23 is performed, that is, the normal call state is entered. If it is determined that the function is enabled, S22 is performed.

S22, when the function of automatically saving the unknown number is enabled, the telephone number that is being answered or dialed is compared with the numbers in the address book. If the comparison is successful, the number that is proved to be saved, and S23 is performed, that is, the normal call is entered. If the comparison is unsuccessful, it is determined that the number is unknown number, and then S24 is performed;

S23, the call process should be entered, no matter whether the function for automatically saving of the unknown number is enabled or not, or whether the comparison is successful or not.

S24, when it is determined that the number is unknown number, after the call is successfully connected, the conversation content is monitored for two minutes, and the conversation content is semantically analyzed during the monitoring process.

S25, after the semantic analysis, the keywords from the conversation content are extracted and the monitoring is ended.

S26, the call is ended.

S27, after the call ends, the prompt box is automatically popped up on the screen of the mobile phone, which prompts a user whether it is necessary to save the unknown number.

S28, if an answer is necessary, the monitored conversation is deleted.

S29, when the unknown number is selected to be saved, the keywords are presented in a list for the user to select.

S30, the correct title or name in the keywords list is selected as the storage name for the unknown number. When there is an error in the keyword in the list, that is, the keyword obtained from the semantically analysis are not totally semantically correct, the keyword in the list is manually modified and entering a correct name relative to the unknown number to be saved.

Assuming that the mobile phone is answering or dialing a call, and the function of automatically saving the unknown number is enabled, and the number of the telephone number being answered or dialed is not successful compared with the number in the address book, that is, the number is unknown number, and the call process is as follows:

Answerer: Hello.

Caller: Hello, I am S.F. express courier, Xiao Wang, are you Miss Li Si?

Answerer: Yes, I am, what is the matter?

Caller: Are you at home? Now that you have a courier delivered to . . .

Answerer: Ok.

. . .

Then, the dialing voice is monitored and semantically analyzed, and the two keywords "S.F. express courier" and "Miss Li Si" are analyzed and extracted, and arranged in a sequential order to form a list. If the user chooses to save, only one of the keywords in the list is selected to save. If the selected keyword has an error, it also can be selected to manually modify and save the correct name for storage.

Figure 3:
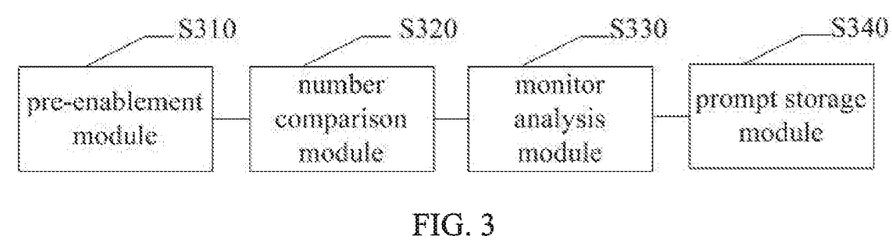
FIG. 3 is a functional block diagram of a preferred embodiment of a system for automatically saving an unknown number in a mobile phone of the present disclosure.

Based on the above embodiment, the present disclosure also provides a system for automatically saving the unknown number in the mobile phone. Referring to FIG. 3, which is a functional block diagram of a preferred embodiment of a system for automatically saving an unknown number in a mobile phone of the present disclosure.

As shown in FIG. 3, the system includes:

a pre-enablement module 310 for enabling a function of automatically saving an unknown number in a setting of the mobile phone in advance. When the function is enabled, the system simultaneously turns on a permission function in the processor to semantically analyze the conversation content, and a duration of the semantic analysis is two minutes after a call is successfully connected. Specifically as described above.

a number comparison module 320 for comparing, by the system of the mobile phone, a telephone number being answered or dialed with numbers in an address book when the mobile phone is answering or dialing the call, and determining whether the telephone number is an unknown number. Specifically as described above.

a monitor analysis module 330 for monitoring a conversation content after the call is successfully connected if the telephone number is an unknown number, and semantically analyzing the conversation content during the monitoring, and extracting keywords from the conversation content. Specifically as described above.

a prompt storage module 340 for automatically popping up a prompt box on a screen of the mobile phone after the call ends, which prompts a user whether it is necessary to save the unknown number, where if an answer is necessary, the keywords are arranged in order for the user to select. Specifically as described above.

Furthermore, in the system for automatically saving the unknown number in the mobile phone, the number comparison module also includes:

a number judgment unit for determining that the telephone number is in the address book, when the mobile phone is answering or dialing the call and the screen also displays the phone number with a name or a title, where the system does not compare the telephone number being answered or dialed with the numbers in the address book. Specifically as described above.

In the system for automatically saving the unknown number in the mobile phone, the monitor analysis module also includes:

a normal conversation unit for operating the system not to process a telephone number and carrying on a normal conversation when it is determined that the telephone number being answered or dialed is not an unknown number. Specifically as described above.

a semantic analysis unit for monitoring the conversation content for two minutes when it is determined that the call being answered or dialed is an unknown number, after the call is successfully connected. The conversation content is semantically analyzed during the monitoring, and a period of the monitoring and a period of the semantic analysis are the same. Specifically as described above.

a keyword extraction unit for extracting the keywords from the conversation content as alternative options for a saved name of the unknown number. Specifically as described above.

In the system for automatically saving the unknown number in the mobile phone, the prompt storage module also includes:

a keyword arrangement unit, after the call ends, for arranging in order of the semantic analysis, by the system, the keywords obtained from the semantic analysis of the conversation content for a period of two minutes. Specifically as described above.

a storage selection unit for automatically popping up the prompt box on the screen of the mobile phone after the call ends. When the unknown number is selected to be saved, the keywords are presented in a list for the user to select, and if the user chooses not to save, the monitored conversation is deleted. Specifically as described above.

a storage modification unit for manually modifying the keyword in the list and entering a correct name relative to the unknown number to be saved when there is an error in the keyword in the list, that is, the keyword obtained from the semantically analysis are not totally semantically correct. Specifically as described above.

In summary, the embodiments of the present disclosure provide a method and a system for automatically saving an unknown number in a mobile phone. The method includes: comparing, by a system of the mobile phone, a telephone number being answered or dialed with numbers in an address book when the mobile phone is answering or dialing a call, and determining whether the telephone number is an unknown number; if the telephone number is an unknown number, monitoring a conversation content after the call is successfully connected, and semantically analyzing the conversation content during the monitoring, and extracting keywords from the conversation content; and automatically popping up a prompt box on a screen of the mobile phone after the call ends, which prompts a user whether it is necessary to save the unknown number, where if an answer is necessary, the keywords are arranged in order for the user to select. The present disclosure analyzes a name of the unknown number in the mobile phone, extracts the corresponding information, and prompts the user whether to save, which can avoid confusion caused by excessive unknown number in the mobile phone of the user, and facilitates the user to manage and save the unknown number.

Figure 4:
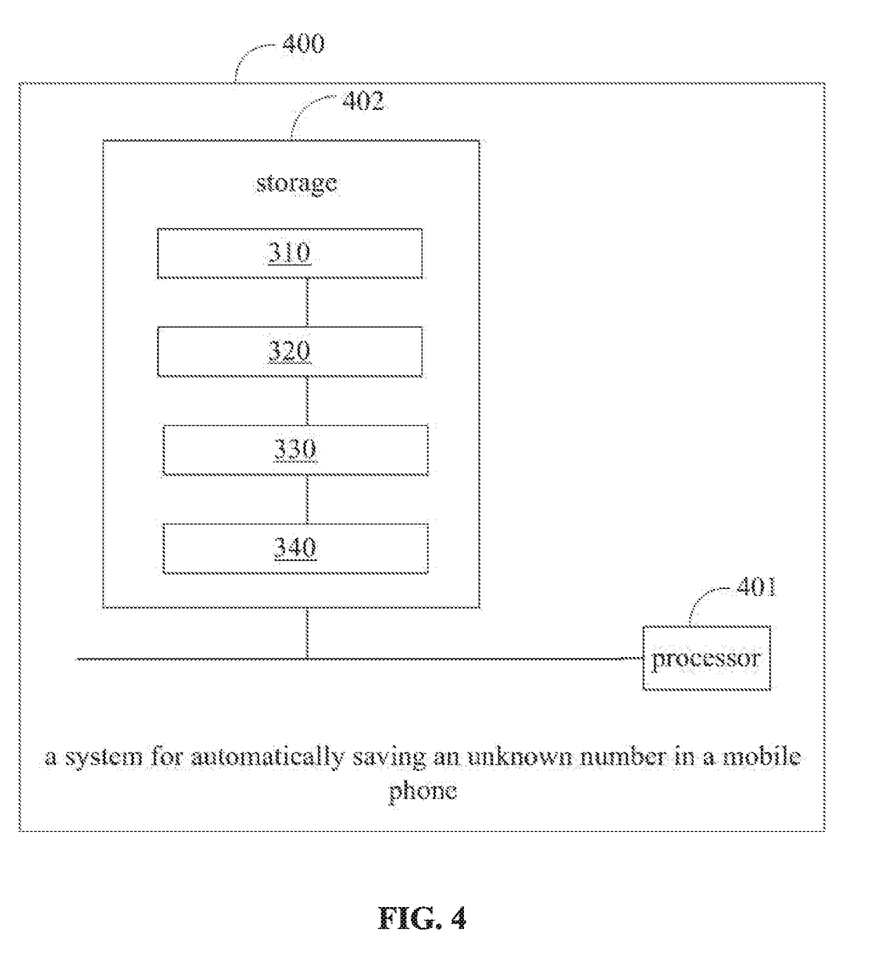
FIG. 4 is a schematic structural diagram of a system for automatically saving an unknown number in a mobile phone according to an embodiment of the present disclosure.

Referring to FIG. 4, those skilled in the art can understand that all or part of the process of implementing the above embodiments can be completed by a computer program to instruct related hardware (such as a processor, controller, etc.). The program may be saved in a computer readable storage medium, and the program may include the flow of embodiments of the methods described above when executed. The storage medium described therein may be a storage, a diskette, an optical disc, or the like.

It should be understood that the application of the present disclosure is not limited to the above-described embodiments, and those skilled in the art can make modifications or changes in accordance with the above description, all of which are within the scope of the appended claims.

What is claimed is:

1. A method for automatically saving an unknown number in a mobile phone, comprising:

enabling a function of automatically saying an unknown number in a setting of the mobile phone in advance, wherein when the function is enabled, a system of the mobile phone simultaneously turns on a permission function in a processor to semantically analyze a conversation content, and a duration of a semantic analysis is two minutes after a call is successfully connected;

comparing, by the system of the mobile phone, a telephone number being answered or dialed with numbers in an address book when the mobile phone is answering or dialing the call, and determining whether the telephone number is an unknown number;

if the telephone number is an unknown number, monitoring the conversation content after the call is successfully connected, and semantically analyzing the conversation content during the monitoring, and extracting keywords from the conversation content;

automatically popping up a prompt box on a screen of the mobile phone after the call ends, which prompts a user whether it is necessary to save the unknown number, wherein if an answer is necessary, the keywords are arranged in order for the user to select.

2. The method for automatically saving an unknown number in the mobile phone as claimed in claim 1, wherein the keywords include a title and a name.

3. The method for automatically saving an unknown number in the mobile phone as claimed in claim 1, wherein in the step of comparing, by the system of the mobile phone, the telephone number being answered or dialed with numbers in the address book when the mobile phone is answering or dialing the call, and determining whether the telephone number is the unknown number, the method further comprises:
when the mobile phone is answering or dialing e call and the screen also displays the phone number with a name or a title, indicating that the telephone number is in the address book, wherein the system does not compare the telephone number being answered or dialed with the numbers in the address book.

4. The method for automatically saving an unknown number in the mobile phone as claimed in claim 1, wherein in the step of if the telephone number is the unknown number, monitoring the conversation content after the call is successfully connected, and semantically analyzing the conversation content during the monitoring, and extracting the keywords from the conversation content, the method further comprises:
operating the system not to process a telephone number and carrying on a normal conversation when it is determined that the telephone number being answered or dialed is not an unknown number;
monitoring the conversation content for two minutes when it is determined that the call being answered or dialed is an unknown number, after the call is successfully connected, wherein the conversation content is semantically analyzed during the monitoring, and a period of the monitoring and a period of the semantic analysis are the same; and
extracting the keywords from the conversation content as alternative options for a saved name of the unknown number.

5. The method for automatically saving an unknown number in the mobile phone as claimed in claim 1, wherein in the step of automatically popping up the prompt box on the screen of the mobile phone after the call ends, the method further comprises;
after the call ends, arranging in order of the semantic analysis, by the system, the keywords obtained from the semantic analysis of the conversation content for a period of two minutes;
automatically popping up the prompt box on the screen of the mobile phone after the call ends, wherein when the unknown number is selected to be saved, the keywords are presented in a list for the user to select, and if the user chooses not to save, the monitored conversation is deleted; and
manually modifying the keyword in the list and entering a correct name relative to the unknown umber to be saved when there is an error in the keyword in the list, that is, the keyword obtained from the semantically analysis are not totally semantically correct.

6. A system for automatically saving an unknown number in a mobile phone, comprising
one or more processors;
a storage; and
one or more application programs, wherein the one or more application programs are saved in the storage and configured to be executed by the processor to perform following steps:
enabling a function of automatically saving an unknown number in a setting of the mobile phone in advance, wherein when the function is enabled, the system of the mobile phone simultaneously turns on a permission function in the processor to semantically analyze a conversation content, and a duration of a semantic analysis is two minutes after a call is successfully connected;
comparing, by the system of the mobile phone, a telephone number being answered or dialed with numbers in an address book when the mobile phone is answering or dialing the call, and determining whether the telephone number is an unknown number;
if the telephone number is an unknown number, monitoring the conversation content after the call is successfully connected, and semantically analyzing the conversation content during the monitoring, and extracting keywords from the conversation content;
automatically popping up a prompt box on a screen of the mobile phone after the call ends, which prompts a user whether it is necessary to save the unknown number, wherein if an answer is necessary, the keywords are arranged in order for the user to select.

7. The system for automatically saving an unknown number in the mobile phone as claimed in claim 6, wherein the keywords include a title and a name.

8. The system for automatically saving an unknown number in the mobile phone as claimed in claim 6, wherein in the step of comparing, by the system of the mobile phone, the telephone number being answered or dialed with numbers in the address book when the mobile phone is answering or dialing the call, and determining whether the telephone number is the unknown number, the processor is further configured to execute:
when the mobile phone is answering or dialing the call and the screen also displays the phone number with a name or a title, indicating that the telephone number is in the address book, wherein the system does not compare the telephone number being answered or dialed with the numbers in the address book.

9. The system for automatically saving an unknown number in the mobile phone as claimed in claim 6, wherein in the step of if the telephone number is the unknown number, monitoring the conversation content after the call is successfully connected, and semantically analyzing the conversation content during the monitoring, and extracting the keywords from the conversation content, the processor is configured to execute:
operating the system not to process a telephone number and carrying on a normal conversation when it is determined that the telephone number being answered or dialed is not an unknown number;
monitoring the conversation content for two minutes when it is determined that the call being answered or dialed is an unknown number, after the call is successfully connected, wherein the conversation content is semantically analyzed during the monitoring, and a period of the monitoring and a period of the semantic analysis are the same;
extracting the keywords from the conversation content as alternative options for a saved name of the unknown number.

10. The system for automatically saving an unknown number in the mobile phone as claimed in claim 6, wherein in the step of automatically popping up the prompt box on the screen of the mobile phone after the call ends, the processor is configured to execute:

after the call ends, arranging in order of the semantic analysis, by the system, the keywords obtained from the semantic analysis of the conversation content for a period of two minutes;

automatically popping up the prompt box on the screen of the mobile phone after the call ends, wherein when the unknown number is selected to be saved, the keywords are presented in a list for the user to select, and if the user chooses not to save, the monitored conversation is deleted;

manually modifying the keyword in the list and entering a correct name relative to the unknown number to be saved when there is an error in the keyword in the list, that is, the keyword obtained from the semantically analysis are not totally semantically correct.

11. A computer-implemented method of a mobile phone, comprising:

comparing a telephone number of an answered call or a dialed number of the mobile phone with an address book of the mobile phone;

determining whether the telephone number or the dialed number is an unknown number of the mobile phone;

responsive to the telephone number or the dialed number is the unknown number, monitoring a conversation content of the call, wherein the monitoring comprises semantically analyzing the conversation content and extracting keywords from the conversation content;

displaying a prompt on a screen on the mobile phone asking a user to save the unknown number and arranging the keywords on the screen for the user to select;

wherein before the step of comparing a telephone number of an answered call or a dialed number of the mobile phone with an address book of the mobile phone, the method further comprises:

enabling a function of automatically saving the unknown number in a setting of the mobile phone in advance, wherein when the function is enabled, the mobile phone simultaneously turns on a permission function in a processor to semantically analyze the conversation content, and a duration of a semantic analysis is two minutes after the call is successfully connected.

12. The method for automatically saving an unknown number in the mobile phone as claimed in claim 11, wherein the keywords include a title and a name.

13. The method for automatically saving an unknown number in the mobile phone as claimed in claim 11, wherein the step of comparing a telephone number of an answered call or a dialed number of the mobile phone with an address book of the mobile phone further comprises:

when the mobile phone is answering or dialing the call and the screen also displays the phone number with a name or a title, indicating that the telephone number is in the address book, wherein the mobile phone does not compare the telephone number of the answered call or the dialed number of the mobile phone with the address book of the mobile phone.

14. The method for automatically saving an unknown number in the mobile phone as claimed in claim 11, wherein the step of responsive to the telephone number or the dialed number is the unknown number, monitoring a conversation content of the call further comprises:

carrying on a normal conversation when it is determined that the telephone number being answered or dialed is not an unknown number;

monitoring the conversation content for two minutes in response to the telephone number or the dialed number is the unknown number; after the call is successfully connected, wherein a period of the monitoring and a period of the semantic analysis are the same; and extracting the keywords from the conversation content as alternative options for a saved name of the unknown number.

15. The method for automatically saving an unknown number in the mobile phone as claimed in claim 11, wherein the step of displaying a prompt on a screen on the mobile phone asking a user to save the unknown number and arranging the keywords on the screen for the user to select further comprises:

after the call ends, arranging the keywords in order of the semantic analysis;

automatically displaying the prompt on the screen of the mobile phone after the call ends, wherein when the unknown number is selected to be saved, the keywords are presented in a list for the user to select, and if the user chooses not to save, the monitored conversation is deleted; and manually modifying the keyword in the list and entering a correct name relative to the unknown number to be saved when there is an error in the keyword in the list, that is, the keyword obtained from the semantically analysis are not totally semantically correct.

* * * * *